United States Patent [19]

Byers

[11] Patent Number: 5,168,945
[45] Date of Patent: Dec. 8, 1992

[54] WEIGHING MACHINE WITH ELONGATED ELASTIC ELEMENT

[76] Inventor: Edward V. Byers, Magnolia, Main St., Kinoulton, Nottinghamshire NG123EA, United Kingdom

[21] Appl. No.: 678,994
[22] PCT Filed: Oct. 27, 1989
[86] PCT No.: PCT/GB89/01281
    § 371 Date: Jun. 26, 1991
    § 102(e) Date: Jun. 26, 1991
[87] PCT Pub. No.: WO90/04759
    PCT Pub. Date: May 3, 1990

[30] Foreign Application Priority Data

Oct. 27, 1988 [GB] United Kingdom ............. 8825114

[51] Int. Cl.⁵ ............................................. G01G 3/00
[52] U.S. Cl. ................................. 177/225; 177/255
[58] Field of Search ............................ 177/225, 255

[56] References Cited

U.S. PATENT DOCUMENTS

| | | | |
|---|---|---|---|
| 2,646,274 | 7/1953 | Weckerly | 177/225 |
| 3,134,451 | 5/1964 | Hanssen | 177/225 |
| 3,734,216 | 5/1973 | Nordstrom et al. | 177/136 |
| 3,741,327 | 6/1973 | Nordstrom et al. | 177/163 |
| 3,889,768 | 6/1975 | Hejzlar | 177/229 |
| 3,938,603 | 2/1976 | Shoberg et al. | 177/211 |
| 4,580,645 | 4/1986 | Shoberg | 177/211 |
| 4,585,082 | 4/1986 | Harrington et al. | 177/210 C |
| 4,611,678 | 9/1986 | Andriewsky | 177/211 |
| 4,629,019 | 12/1986 | Harrington et al. | 177/210 C |
| 4,650,016 | 3/1987 | Andriewsky | 177/211 |
| 4,657,096 | 4/1987 | Angelbeck | 177/163 |
| 4,708,217 | 11/1987 | Andriewsky | 177/211 |

FOREIGN PATENT DOCUMENTS

| | | |
|---|---|---|
| 0025807 | 4/1981 | European Pat. Off. . |
| 2302832 | 9/1973 | Fed. Rep. of Germany . |
| 2929137 | 1/1981 | Fed. Rep. of Germany . |
| 3538178 | 4/1987 | Fed. Rep. of Germany . |
| 0650078 | 6/1985 | Switzerland . |
| 2122359 | 1/1984 | United Kingdom . |

Primary Examiner—Benjamin R. Fuller
Assistant Examiner—Randy W. Gibson
Attorney, Agent, or Firm—Griffin, Butler, Whisenhunt & Kurtossy

[57] ABSTRACT

A weighing scale in which the weighing platform rests on elongate elastic elements such as leaf springs suspended between fixed supports such that an imposed load anywhere on the platform produces a resultant displacement of the platform at an invariant position and corresponding to the magnitude of the imposed load. The invention does away with the complicated mechanism presently used in weighing scales to ensure the parallel descent of the platform in the interest of accuracy of measurement.

13 Claims, 7 Drawing Sheets

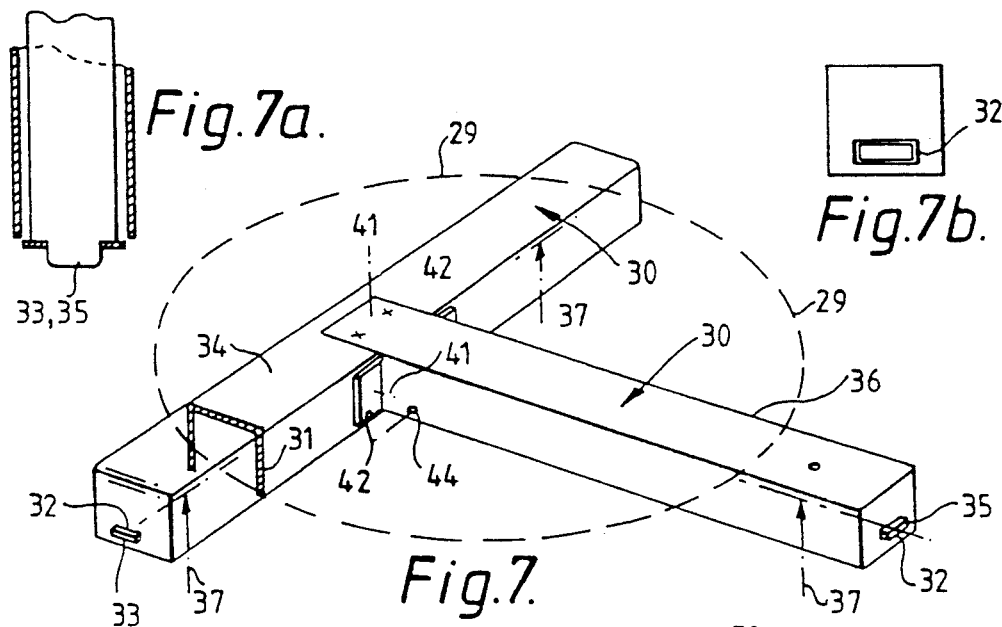
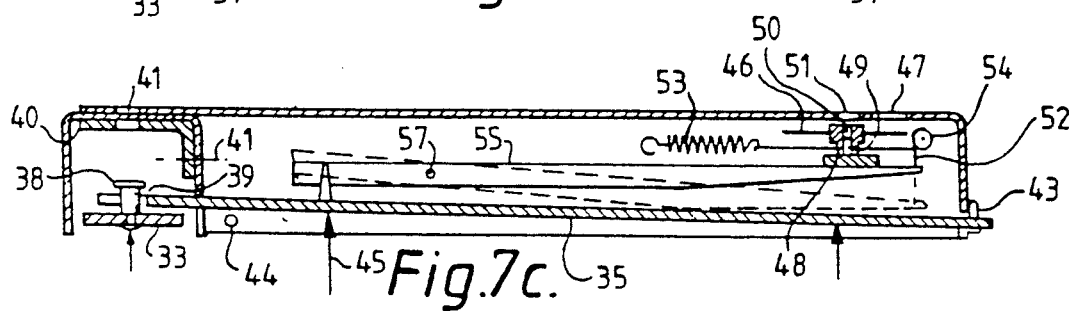
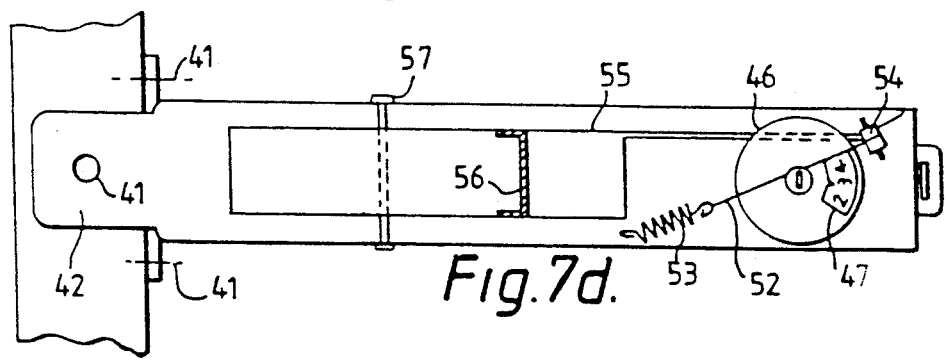
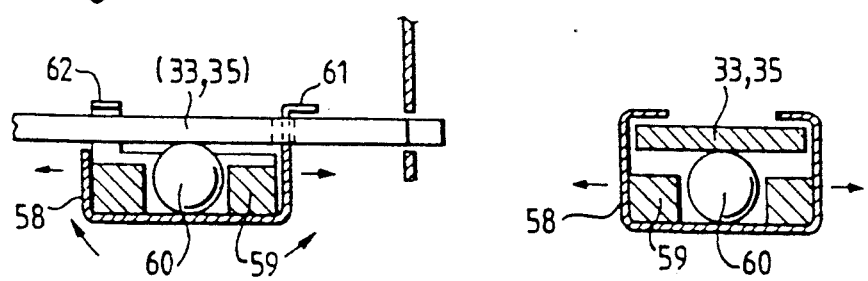

WEIGHING MACHINE WITH ELONGATED ELASTIC ELEMENT

FIELD OF THE INVENTION

The present invention relates to force measuring apparatus in particular weighing machines of the platform type in which the magnitude of the imposed load is determined from the deflection of resiliently elastic elements such as coil or leaf springs.

Present weighing machines in general use employ complicated mechanisms to ensure the parallel descent of the weighing platform for the purposes of obtaining an accurate reading of weight.

By virtue of their complicated design they restrict efforts to cheapen their cost of manufacture and in some cases lack sufficient accuracy.

A lesser known domestic weighing machine employs three coiled springs of equal spring rate arranged at the corners of an equilateral triangle.

The coiled springs support the weighing platform and the measurement point for an imposed load at any position on the platform is taken from a central point of the equilateral array whereat the deflection of downward displacement of the platform will always correspond to the magnitude of the imposed load.

This known weighing machine has proved of some utility in domestic situations but it lacks the required accuracy for wider applications.

Moreover the tilting of the platform which necessarily occurs by virtue of its design is not a desirable feature and should for example the tilting be sufficient to take the platform out of contact with one or more of the coiled springs the effect on accuracy may be catastrophic.

However, the desirability of having a central take-off point as a measurement point using coiled springs more or less is a determinant of the known design since it is predicated on the knowledge that to realise a central take-off point required the coiled springs to be symmetrically and equiangularly disposed.

SUMMARY OF THE INVENTION

It is an object of the present invention to obviate the disadvantages of the prior art and to provide a weighing machine which provides a measurement of weight with high accuracy and without recourse to the procrustean devices of varying degrees of complexity which are employed at the present time to ensure the parallel descent of the weighing platform.

According to the present invention there is provided a weighing machine comprising one or more elongate elastic elements which provide for restorable deflection under load, the or each elastic element being mounted between spaced support means therefor, a weighing platform resting on the or each elastic element such that an imposed load at any position on the platform produces a resultant displacement thereof occurring at an invariant position and corresponding to the magnitude of the imposed load, and means for responding to said resultant displacement at said fixed position whereby to provide a measure of the magnitude of the imposed load on the platform.

Preferably the elastic elements are two leaf springs which are suspended between rigid supports forming the corners of a rectangle of which the leaf springs form parallel sides. With this arrangement the invariant position lies at the geometrical centre of the rectangle.

BRIEF DESCRIPTION OF THE DRAWINGS

Embodiments of the invention will now be described by way of example with reference to the accompanying drawings wherein;

FIG. 2b is a side, schematic, partially-sectional view of the structure of FIG. 2a;

FIG. 7 is simplified perspective view view of a weighing machine according to an embodiment of the invention and employing the Tee-shaped leaf arrangement shown in FIG. 6;

FIG. 7a is a partially sectional view taken on a portion of FIG. 7;

FIG. 7b is an end view of a portion of FIG. 7;

FIG. 7c is a partially sectional view taken on a portion of FIG. 7;

FIG. 7d is a plan view of a portion of FIG. 7 with additional elements included which are not included in FIG. 7;

FIG. 7e is partially sectional view taken on a portion of the structure of FIG. 7, but with elements included not shown in the other drawings;

FIG. 7f is a partially sectional view taken on a portion of the structure of FIG. 7, but with elements included not shown in the other drawings;

BEST MODES OF CARRYING OUT THE INVENTION

Figure 1:
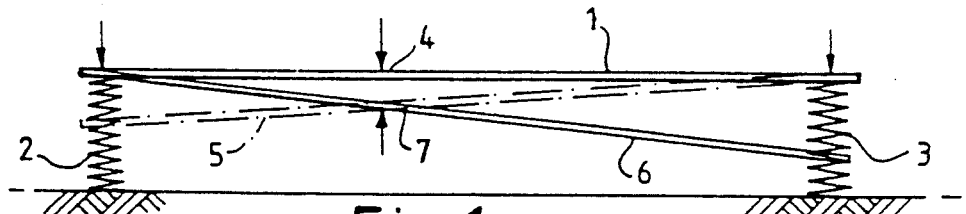
FIG. 1 side schematic, partially-sectional, view a beam under load supported at its ends by coiled springs of differing spring rates as an illustration of the production of an invariant off-centre measurement point to explain the theory behind the invention.

With reference to FIG. 1, a stiff beam 1 is shown supported at its ends by coiled springs 2 and 3 of differing spring rates.

If a load 4 be applied to the beam directly above spring 2 this spring will become compressed but the other spring 3 will remain uninfluenced and the beam will tilt slightly as shown exaggeratedly by line 5.

If the same load is now transferred to the other end directly above spring 3 the beam will tilt slightly in the opposite sense as shown by line 6.

At some point 7 the two tilt lines will intersect, the deflection at this point remaining the same for either loading condition.

However, since the springs 2 and 3 have the property of direct proportionality of deflection to load the deflection at point 7 will be proportional to such load fraction as is applied to spring point 2 only.

If the remaining fraction of the load now be applied simultaneouly at the opposite end there will be a further deflection at point 7 which is proportional to that remaining fraction. The sum of the deflections will therefore be the same as that obtained by applying the whole of the load to either of the end positions.

It follows that any fractionation of the load between the two end loading points will always result in the same deflection at point 7 and that this will also be the case when the whole of the load is applied to any part of the beam or distributed in any manner along its length.

Figure 2A:
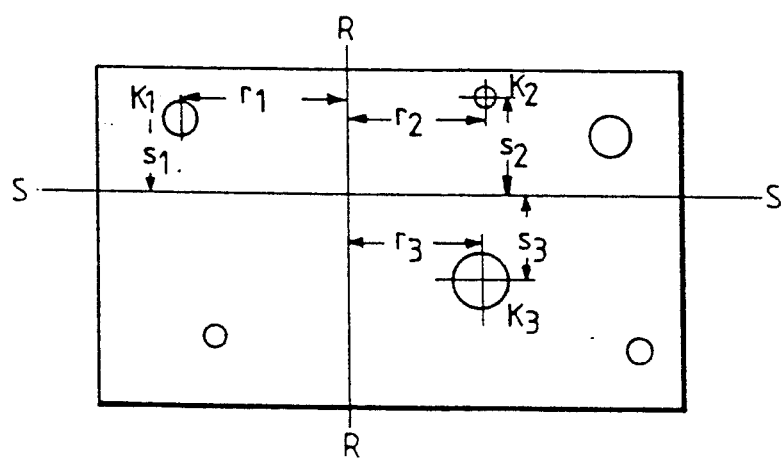
FIG. 2a is a plan and side view of an arrangement of coiled springs of differing spring rate supporting a stiff plate further to illustrate the production of an off-centre invariant measurement point according to the theory behind the invention.
Figure 2B:
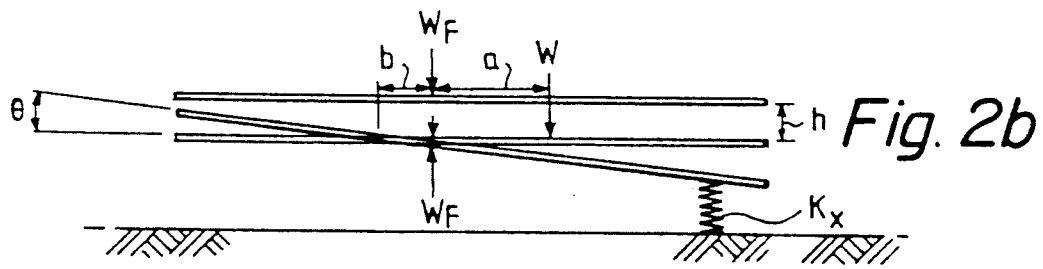

FIG. 2 shows plan and elevation views of a two-dimensional configuration of several springs supporting a loading platform and which may have differing spring rates $$K_1, K_2, K_3, \ldots K_x, \text{etc.},$$

situated at distances $$r_1, r_2, r_3, \ldots r_x, \text{etc., and}$$

$$s_1, s_2, s_3, \ldots 2_x, \text{etc.,}$$

respectively from two mutually perpendicular axes RR and SS across the configuration, all the springs being attached at their ends to a supporting surface and a stiff plate so that they are capable of acting in both compression and tension, arrangements being made to ensure that all the springs are initially unstressed.

If the plate be now forced downwards through a distance h in such a manner that it remains parallel to its orignal position then the generally accepted definition of spring rate being the number of units of force required to produce a single unit of deflection, leads to the conclusion that the springs are exerting upward forces of $$K_1 h, K_2 h, K_3 h, \ldots K_x h, \text{etc.,}$$

which may be balanced by a single force W acting at a particular point on the plate. The magnitude of this force is given by $$W = \Sigma Kh = h \Sigma K.$$

If the locations of the axes RR and SS have been suitably chosen there must be no tilting effect upon the plate which means that the algebraic sum of the moments of the various spring forces about either axis must be zero. This indicates that for the axis RR the sum of the moments $$\Sigma Khr = 0$$

the various values of r being taken as positive if they lie to one side of RR and negative if they lie to the other side. Since the constant h may be divided out $$\Sigma kr = 0,$$

the correct position of axis RR which coincides with the line of action of the single force W being given by this equation, the position of axis SS being similarly given by the equation $$\Sigma Ks = 0.$$

The side elevation of the arrangement shown in FIG. 2 is a view perpendicular to the axis RR with the force W moved to the right to a distance a from RR thus causing a clockwise tilt through a small angle $\theta$. Only the general spring of rate $K_x$ situated at $r_x$, $s_x$ is shown.

If it now be supposed that there are two imaginary oppositely directly forces $W_f$ both equal to force W acting vertically at the original position RR, they cannot have any effect upon the location or attitude of the plate, but may be imagined as acting as a single downward force $W_f$ together with a twisting couple (Wa) causing the clockwise motion.

The single force $W_f$ will produce a deflection h as before, but there may be additional motion due to the twisting effect.

If it be supposed that the plate is twisting about some point b to the left of RR, then the force provided by the general spring of rate $K_x$ is now acting at a distance $$r_x + b$$

from the assumed pivoting point causing the spring length to be altered by an amount equal to $$(r_x + b) \tan \theta$$

resulting in an additional force $$\Sigma K_x(r_x + b) \tan \theta$$

which is upward or downward depending on whether it is to the right or left of the pivoting point. Since a pure couple cannot result in a net vertical force, the sum of all the additional forces in the springs must be zero, indicating that $$\Sigma K(r + b) \tan \theta = 0$$

r being taken as positive if to the right and negative to the left. On dividing out the constant $\tan \theta$ and rearranging, $$\Sigma Kr + \Sigma Kb = 0$$

but it is already established that for the axis RR $$\Sigma Kr = 0$$

and this leaves $$\Sigma Kb = 0$$

which is true only if $$b = 0$$

This means that the plate is tilting about the axis RR and similar reasoning leads to the conclusion that this is also true for the axis SS or any other axis through and perpendicular to the line of action of the force W in its original position.

The important fact is that the downward displacement of the plate at the point where the axes RR and SS intersect is invariant and its measure will always provide a correct indication of the imposed load on the plate regardless of its position or distribution.

The point is hereinafter referred as the measuring point and may be defined as the point at which the application of a single point load will cause the loading plate or platform to move so that its attitude always remains in parallelism.

If, for any reason, a knowledge of the tilt angle is desired, it may be deduced as follows. The alteration of length of the general spring at $r_x$, $s_x$ has already been given as $$(r_x + b) \tan \theta$$

causing the spring to exert additional force $$K_x r_x \tan \theta$$

since b is now known to be zero, and the moment of this force about RR is $$(K_x r_x \tan \theta) r_x = K_x r_x^2 \tan \theta$$

and the sum of the turning moments provided by the simultaneous action of all the springs must equal the moment of the force W moved from the measuring point by a distance a, which means that $$Wa = \Sigma K r^2 \tan \theta, \text{ but also } Wa = ah \Sigma K$$

It is noteworthy that the application of a single point load to any spring loading point will always result in the same deflection at the measuring point, this being a characteristic which is sometimes useful in establishing the location of the measuring point.

Figure 3:
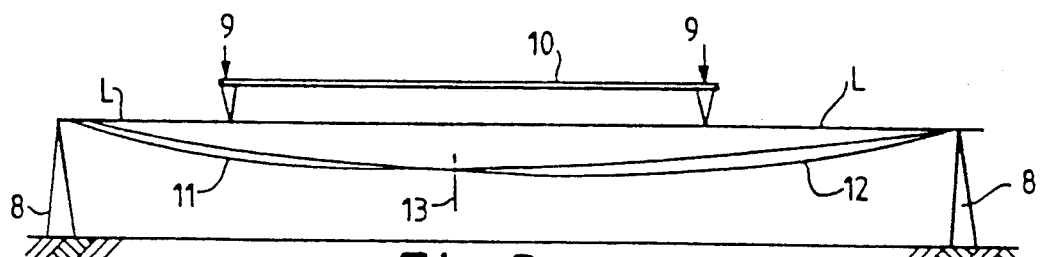
FIG. 3 shows a side schematic, partially sectional view a leaf spring supported at its end and under asymmetric load to produce a longitudiual off-centre invariant measurement point.

FIG. 3 illustrates the existence of an invariant measuring point when a leaf spring L is supported at its ends at points projecting from a rigid unyielding support surface and loaded at defined points 9 by a stiff beam 10.

If a load is applied to the beam directly about the leaf spring loading point at the left hand end of the beam 10, the leaf spring L will deform to a curved shape shown exaggeratedly at 11. Transfer of the load to the opposite end of the beam L will result in a different curve 12. At some point 13 the curves will intersect, the deflection being equal at this point thus providing an invariant measurement point as before. The magnitude of the deflection at that measuring point will give a true inference of the value of the imposed load however it be placed on the beam.

An asymmetrical arrangement is shown in FIG. 3 and the beam need not have the same cross section along its length, but it is important that the longtudinal elastic centre-line about which the section is at all points symmetrical should be a straight line with which the support and loading points are coincident. A symmetrical support and loading arrangement and constant spring leaf cross section would have its measurement point at the longitudinal centre of the leaf.

Figure 4:
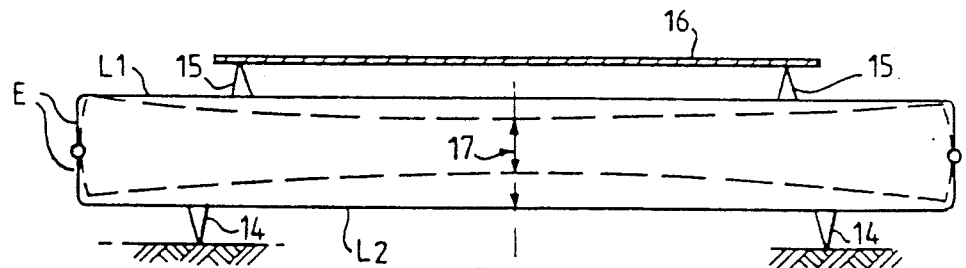
FIG. 4 shows is a side, schematic, partially-sectional view of a back to back arrangement of two leaf springs under symmetric loading to provide a centrally positioned invariant point.

FIG. 4 shows a back-to-back arrangement of two leaf springs $L_1$ and $L_2$ spaced apart and pivotally connected at their ends E by any convenient method. The lower leaf $L_2$ is provided with two projections 14 to support it above an unyielding surface. The upper leaf $L_1$ also has two projections 15 to engage either a loading beam or the rigid base of any weighty object 16. The support and loading points need not coincide vertically, but, provided that they are symmetrical about the centre point of the length, the measurement points for both leaves will be at the centre 17 and the change in distance between them may be used to provide an accurate indication of the magnitude of the imposed load.

Figure 5:
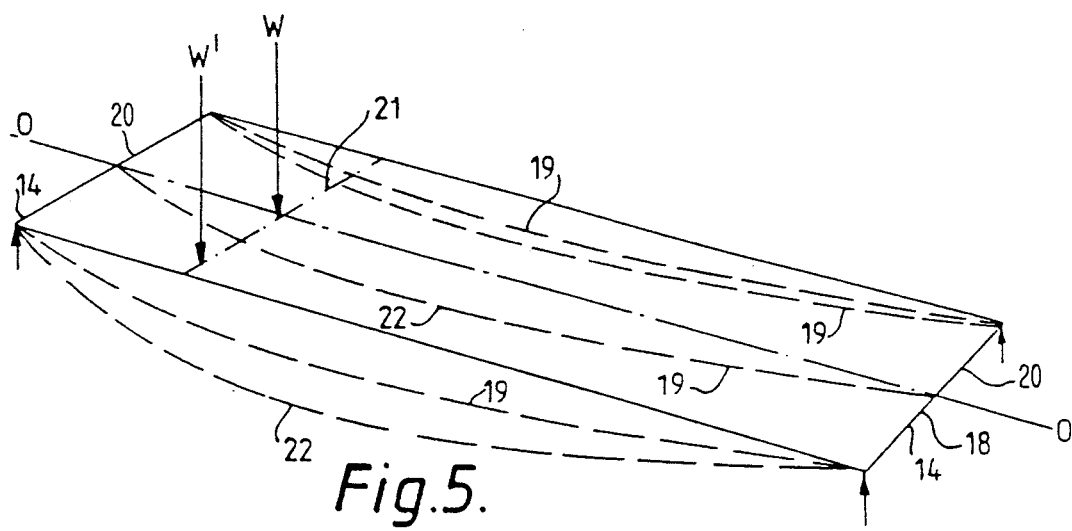
FIG. 5 is a perspective, schematic, view of a leaf spring illustrating the action of a load on a leaf spring supported at its ends and having appreciable width in relation to its length.

FIG. 5 shows the action of a load W on a leaf spring 18 having appreciable width in relation to its length. Provided that the elastic centre of the leaf spring 18 as previously defined is a straight line, as at 0—0, a load applied to this line close to one end at W will result in flexure shown by the curved line 19, the edges of the leaf spring 18 lying in exactly parallel curves.

If the leaf spring 18 be now regarded as supported at support lines 20 rather than points and the load be applied to a loading line 21 only, both support and loading lines being mutually parallel and all perpendicular to the elastic centre line, then movement of the load along the loading line will result in twisting actions being imposed in addition to the curvature already created, the plate edges then being represented by lines 22. Using theoretical arguments similar to those given in relation to FIG. 2, it is readily deduced that the shape of the curvaceousness of the centre line remains unaltered.

This means that wide spring leaves may be used in the arrangements shown in FIGS. 2 and 4, the measurement points lying on the elastic centre lines of the leaves as well as on the longitudinal points already discovered.

FIG. 4, particularly, provides a viable form of weighing machine, with both leaves of regular cross-section and having vertically coincident elastic centre lines although they may differ in other respects. A given weight will always result in the same approach of the measurement points no matter how it is distributed between or along the loading lines.

Figure 6:
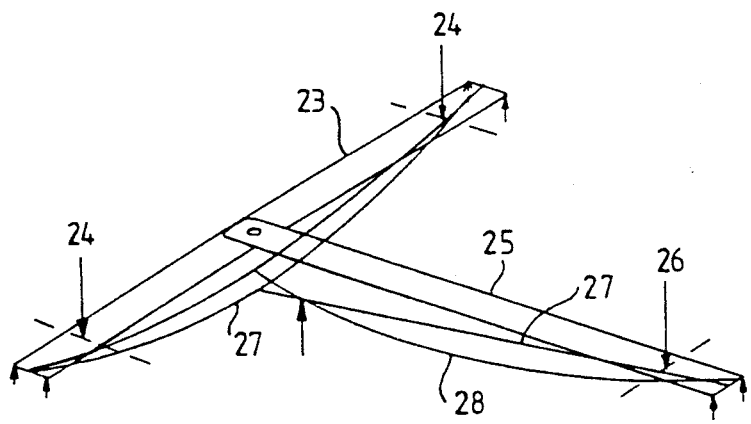
FIG. 6 is a perspective, schematic, view of a Tee-shaped arrangement of leaf springs in perspective.

FIG. 6 is a further explanatory diagram describing a Tee-shaped arrangement of leaf springs which is used in inverted form in an important embodiment to be described later with reference to FIG. 7.

The bar of the Tee is a leaf spring 23 of regular cross-section supported at its ends and loadable at points 24 symmetrically disposed about the centre of its length, at which position an invariant measurement point exists as previously described.

Articulately connected to this point is a second leaf spring 25 perpendicularly projecting to a support point at its end, forming the leg of the Tee and which is provided with another defined loading point 26 some distance towards the Tee-junction. This leaf spring 26 does not need to bear any special dimensional relationship to the leaf spring 23 to which it is joined.

When a load is applied to one of the loading points 24 of the leaf spring 23 it will flex downwards, the measurement point at the centre deflecting by the same amount no matter which loading point is used and no matter how it is distributed between them. The leaf spring 25 will then behave as a simple straight lever, tilting downwards about its support point 26. The combined effect on both leaves is shown by lines 27.

When the same load is now transferred to the loading point 26 the Tee-bar will experience a vertical force causing it to flex downwardly and this effect must be superimposed on the curvaceous flexure inflicted upon the leaf spring leg 25 resulting in curves shown at 28. This curve will somewhere intersect the inclined straight line of the leg 25 already described for the first loading condition. The equations to both the straight line and the curve may be discovered by use of the mathematical theory of elasticity and a knowledge of the geometrical layout and elastic properties of the two leaf springs 23 and 25.

The intersection point may then be discovered by solving the cubic equation which results from equating the deflection of both curves in relation to the distance from support for the leaf spring leg 23. Usually two points are found. One is too close to the leg support to be of practical value, and the other is usually quite close to the geometrical centre of the triangle defined by the three support points.

By previously established theory the position discovered must be an invariant point where the delfection of the leaf spring 23 remains invariant regardless of the distribution of the load between the three loading points, and the measure of this deflection will always provide a true indication of the force imposed on the structure through a suitable loading platform, regardless of how it is applied thereto.

In any of the systems described or to be described in relation to practical embodiments of the invention, any known method of translating the deflection at the measurement point may be used to translate the information into a sensible indication of the magnitude of the imposed load either in the apparatus itself or when transmitted to some remote point.

FIG. 7 shows an embodiment of a weighing machine for providing a continous indication of the remaining contents of fuel gas bottles. It may also be used for any opaque container of liquids or solids, such as a beer barrel for instance as shown in dotted outline 29.

A stiff loading platform 30 is provided by the assembly of two channel-shaped members of general section shown at 31. These are united by, for instance, spot-welding, to form a Tee. The channel ends are formed downwardly and are furnished with slots 32 for receiving the formed ends of two leaf springs one 33 lying along the length of the Tee-bar 34 and the other 35 loosely connected to the centre point thereof and forming the Tee-leg 36.

The leaves 33 and 35 fit into the channel ends as shown in FIG. 7(a) and the slot 32 at one end of the Tee-bar is preferably provided with an arcuate upper surface as shown in FIG. 7(b) to eliminate difficulties which may arise owing to a slight initial twist in the respective leaf spring.

The spring leaf arrangement is an inverted form of that shown in FIG. 6, three support points being provided at positions 37 by means which are described in detail later.

FIGS. 7(c) and 7(d) are cross-sectional elevation and plan views respectively of the Tee-leg 36. The leaf springs 33 and 35 are joined together at the mid-point of leaf spring 33 by means of a rivet pin 38 engaging a slot 39 in one end of leaf spring 33, as seen from FIG. 7(c). This view also shows a section of stiff angle piece 40 extending across the central part of the Tee-bar 34 and in which are provided three threaded holes 41 to permit pierced tabs 42 formed on the leg 36 to be secured to the bar 34 as by bolting.

This allows the machine to be dismantled into two parts to reduce greatly the transportation bulk.

Escape of the spring leaf 35 is prevented, when disassembled, by a split pin 43 and cross bar 44.

The invariant measurement point is shown at 45 in FIG. 7(c) found by the methods discussed in relation to FIG. 6. Vertical motion of this point relative to the channel structure is used to actuate an indicator mechanism of any known type.

One type of indicator which may be used is a marked disc 46 see FIGS. 7(c) and 7(d), part of which is visable through an aperture 47 in the upper surface of the Tee-leg 36.

The disc 47 is carried by a boss 48 rotating on a spindle 49 attached to the general structure. The spindle 49 is provided with a slot 50 at its upper end which is accessible to a screwdriver through a vertically coincident hole 51 in the wall of the leg 36.

The disc boss 48 is rotated by the action of a fine flexible cord 52 wound round the boss and attached at one end to an extension spring 53, the other end passing round a guidance roller 54 and being attached to the end of an invariant point spring deflection magnifying lever 55.

For the sake of clarity the details of the emplacement carrying the parts are not shown. When a fully charged container is placed upon the machine the indicator disc 46 may be adjusted against the frictional restraint of the driving cord 52 by means of a screwdriver operating through the slot 51 to show the known full charge thus allowing for possible variations in tare weight of the container.

Lever 55 is of light aluminium channel construction as shown at section 56 and is pivotally mounted in the Tee-leg 36 at a pivot rod 57. The lever 55 is formed as shown to provide a cord anchorage point.

A projection from the spring leaf 35 at the measurement point 45 actuates the lever 55 and will usually take the form of an adjustable pointed screw.

To allow for previously mentioned alterations in spring leaf lengths and absence of flatness in the support surface it is desirable to provide articulation at support points 31.

FIGS. 7(e) and 7(f) are cross-sectional views of a suitable support. This comprises a metal pressing 58 in the form of an open rectangular box in which a moulding 59 centrally confines a metal ball 60 so as to permit a slight degree of movement.

Ball 60 bears against the spring leaf 33, 35 and pressing 58 is provided with two pairs of formable tabs. Tabs 61 pass loosely through slots in the sides of the channel end and are bent over to prevent withdrawal. The other pair of tabs 62 pass upwards at the leaf spring sides and are bent inwardly thereover. The fitting is deliberately loose to act as a form of universal joint without interfering to more than a very slight extent with the correct location of the ball 60.

Figure 8:
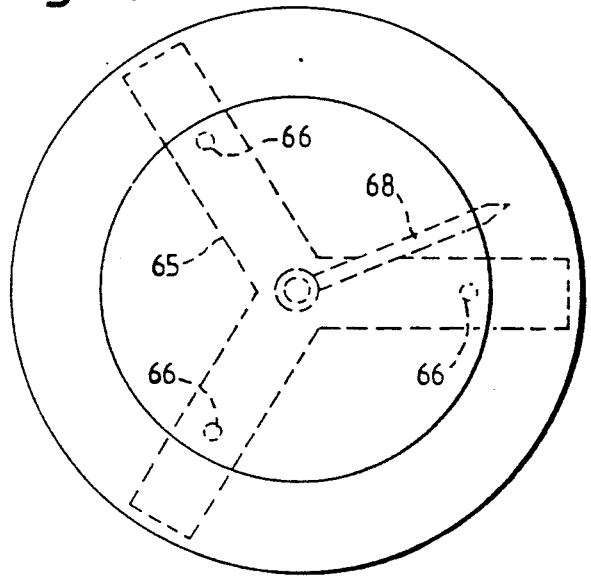
FIG. 8 is a plan, view, of a weighing machine in the form of a domestic scale according to another embodiment of the invention.
Figure 8A:
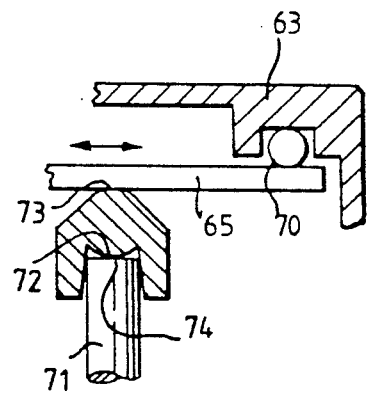
FIG. 8a is a partial, sectional view taken on a portion of FIG. 8.
Figure 8B:
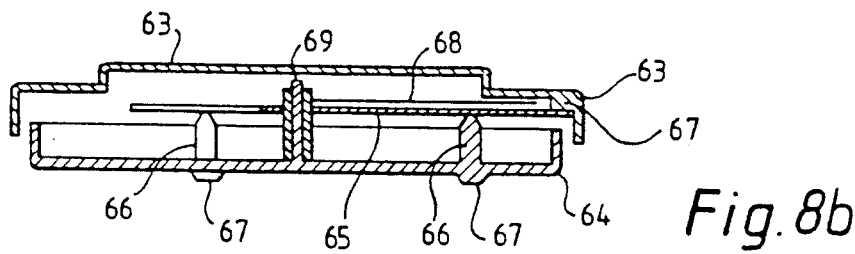
FIG. 8b is a sectional view taken on a portion of FIG. 8.

FIGS. 8 and 8(a) show another version of a domestic weighing scale incorporating the present invention.

This embodiment comprises upper and lower plastics moulded shells 63 and 64, the upper shell forming the weighing platform.

A symmetrically shaped three limbed metal leaf spring 65 rests on three hemispherically ended pegs 66 vertically coincident with support projections 67 on the base of the lower shell 64.

The upper shell 63 has an annular abutment 67 which rests on the ends of the limbs of the leaf spring 65 as shown.

In this case the invariant measurement point is at centre of the spring which moves upwards under the influence of loading on the upper shell 63. This motion may be converted to rotary movement of the boss of a pointer 68 located upon a central spindle 69 projecting upwards from the lower shell 64 through a central clearance hole in the leaf spring 65. The spring 65 may be a single pressing or made from three equal leaves spotwelded to a central washer.

If maximum sensitivity is required from this and other embodiments using leaf springs allowance must be made for the fact that there is a very slight altering in spring length due to the bending effect.

Articulated support and loading points to permit this to happen without longitudinal frictional restraint may then be provided as show in detail in FIG. 8a. As shown in FIG. 8a the upper shell 63 is provided with rollers 70 which are confined in emplacements to permit a small movement. Flatended support pegs 71 cooperate with cylindrical mouldings 72 locating with a slight degree of freedom of movement. Mouldings 72 are furnished with partspherical upper and lower engaging surfaces 73 and 74 for leaf spring 65 and peg 71 respectively thus permitting the frictionless relative motion of the spring leaf 65 to the very slight extent required.

Difficulties are encountered when the measurement point is inaccessible such as may occur when it is required to make a weighing machine with a large central aperture for accepting a weighty object with a domed end. Circumstances may also arise in which it is undesirable to use the measurement point directly as would arise with loading platforms of thin pressed metal which may have very stiff sides but quite flexible portions thereinbetween. With a loading of indeterminate position the deflections in the platform will also be indeterminate and my result in inaccuracies.

These difficulties may be overcome by inferring the deflection at the measuring point from the motion of a lever which bears on the platform at two points colinear with the measurement point as will be explained with reference to FIG. 9.

Figure 9:
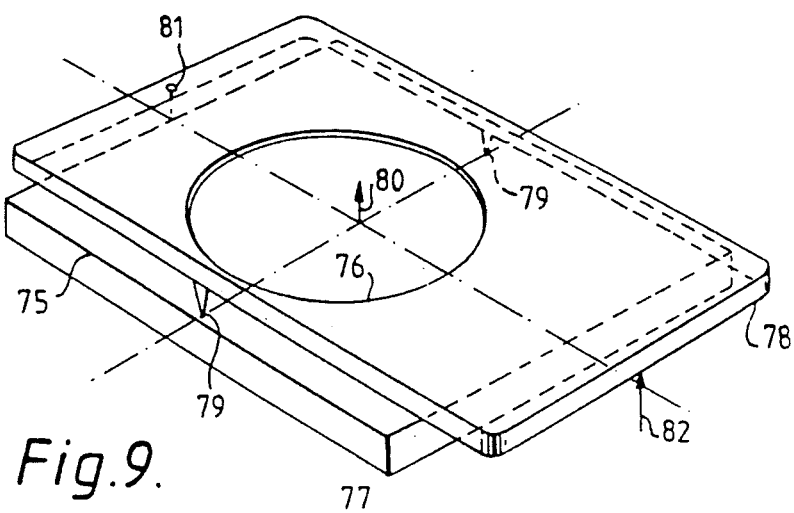
FIG. 9 is a perspective view of a weighing machine according to a further embodiment of the invention.

The machine shown in FIG. 9 has a rectangular platform 75 with a circular aperture 76 having its sides 77 folded downwards to provide considerable rigidity therealong.

A bifurcated lever 78 bears on the surface of the platform 75 close to the rigid sides at definite points 79 which are disposed so as to be colinear with the measurement point 80.

The lever 78 is pivotally mounted in the support structure (not shown) at 81 in such a way as to be able to rotate in any direction.

A new measurement point 82 is found at the other end of the lever 78 at a point which is colinear with both pivot point 81 and measurement point 80, but not necessarily equidistant therefrom. The free lever end of the lever 78 then moves in direct proportionality to the measurement point regardless of any tilting motion of the platform.

In the interests of clarity FIG. 9 shows the lever 78 above the platform 75, but the positions will almost invariably be reversed, the lever 78 being concealed by the platform 75. The operating principle is however, in no way changed.

Figure 10:
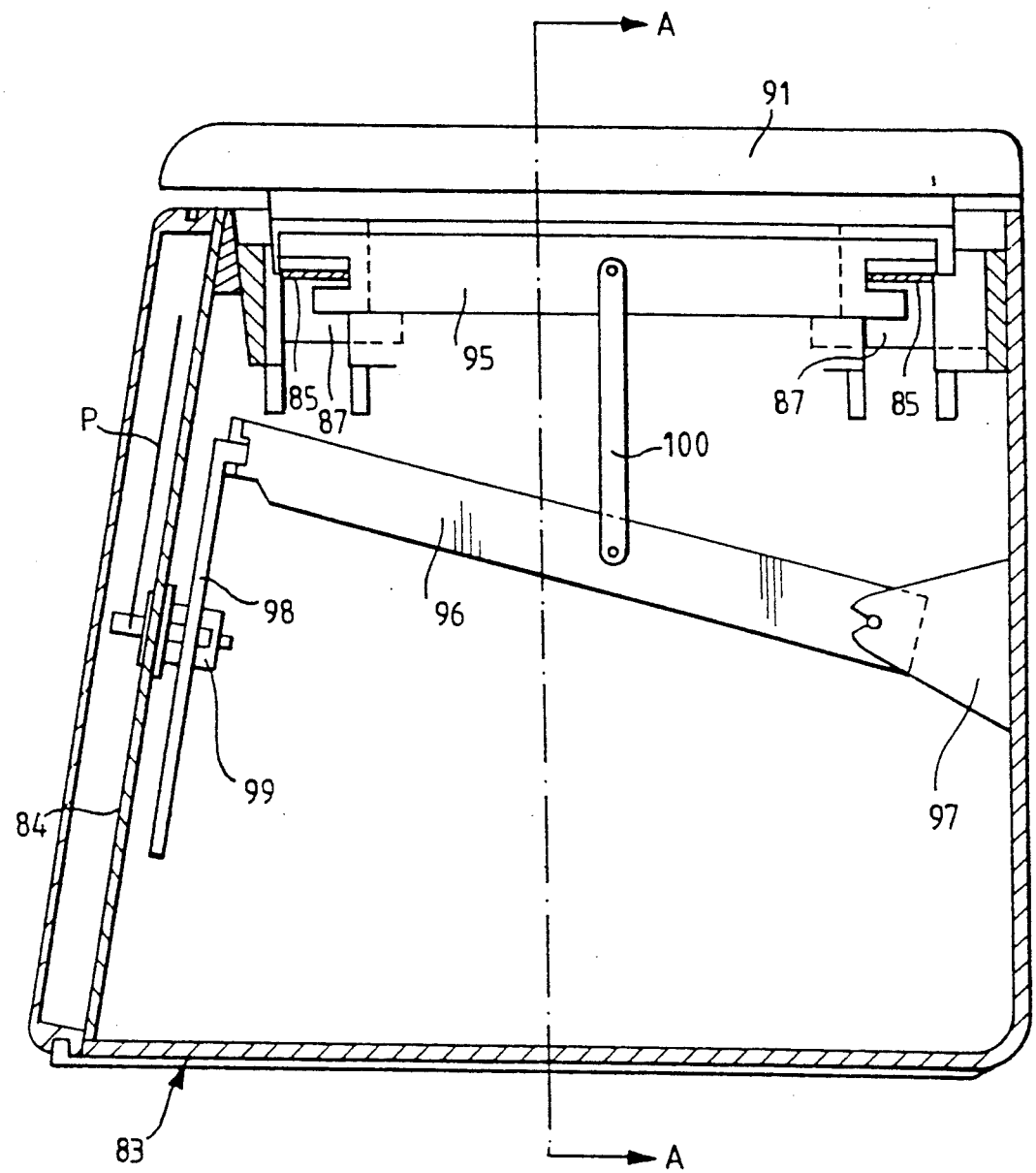
FIG. 10 is a side, sectional, view of a weighing machine according to another embodiment of the invention.
Figure 11:
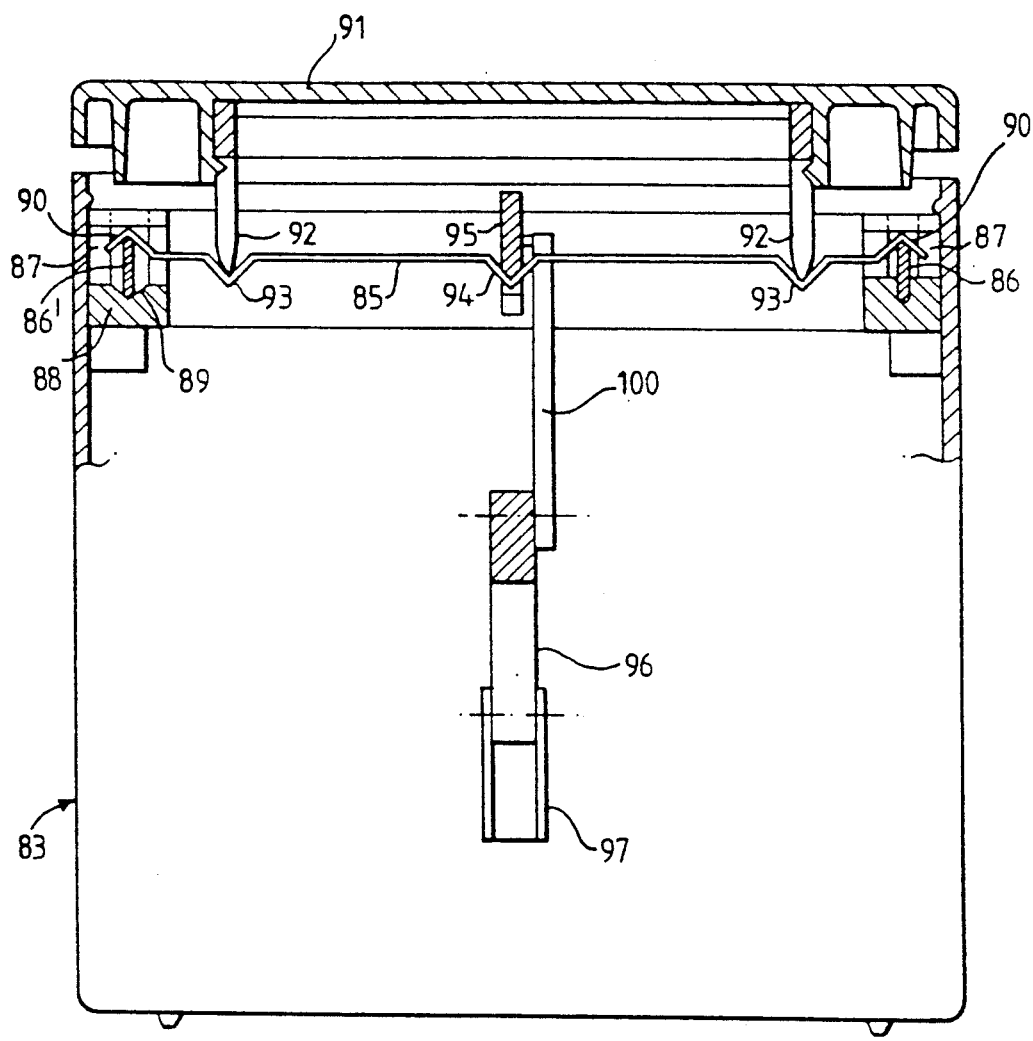
FIG. 11 is a sectional view along the line XI—XI of FIG. 10.
Figure 12:
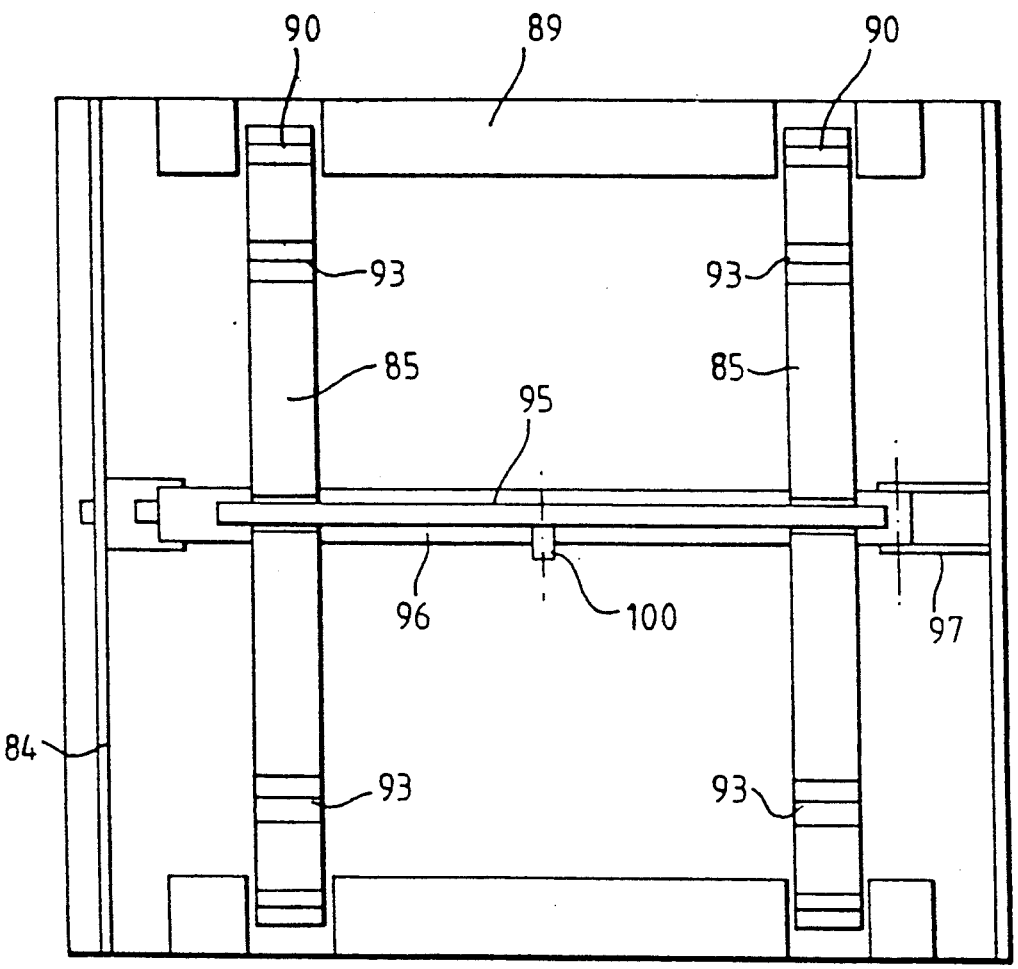
FIG. 12 is a plan view of the device of FIG. 10 with the platform removed.

The weighing machine shown in FIGS. 10, 11 and 12 comprises a housing 83 having a sloping front face containing a weight measuring scale 84.

Two equal length leaf springs 85 of thin strip materials extend across the open top end of the housing 83.

The springs 85 are of equal spring rate and arranged in parallel with their ends resting on support pieces 86, 86' in the form of short rigid rectangular metallic strips housed in recesses 87 in support bars 88 running the length of the housing.

The support pieces are located at the corners of a rectangle of which the springs 85 form parallel sides.

One of the support pieces 86 for each spring leaf 85 is held in a vertical rigid position, while the other support piece 86' sits loosely in a V-shaped groove 89, to form a floating rocker which allows for tiny alterations in overall spring length and compensates for variations in respective spring characteristics.

The ends 90 of each spring leaf are in the form of inverted V's for engagement over a respective support piece 86, 86' as shown.

A weighing platform 91 is supported on the two parallel leaf springs 85 and covers the open end of the housing 83.

The weighing platform 91 has spaced parallel support legs 92 which run the length of the weighing platform 91 which are received in V-shaped indents 93 at respective transverse spaced positions along the length of each leaf spring 85, each indent 93 being positioned at the same distance from a respective adjacent support piece 86, 86' such that the weighing platform 91 is symmetrically supported in stable orientation on the leaf springs 85.

The centre point of each leaf spring 85 has a V-shaped indent 94 and a rigid bar 95 extends between the leaf springs 85 to rest in the V-shaped indents 94 at the centre point of each leaf spring 85.

A lever 96 extends across the housing being pivotally mounted to one side of the housing on a fixed support 97.

The other end of the lever is provided with a downwardly extending arm 98 lying in the same plane as the dial 84 on the front face of the housing 83.

The downwardly extending arm 98 forms the rack of a rack and pinion coupling 99 which serves to translate downward displacements of the weighing platform 91 into a rotary motion to drive a pointer P rotatably mounted to the coupling 99.

The rigid bar 95 between the two springs 85 is connected to the lever 96 by means of a connecting rod 100, rigidly connected to the bar 95 and pivotally connected to the lever 96.

In the arrangement described the invariant measurement point lies at the centre of the rigid bar 85 from which extends the connecting rod 100 to the pivotal lever 96.

Consequently when a load is applied to the weighing platform the invariant measurement point is at the geometrical centre of the rectangle formed by the support pieces 86 for the leaf springs 85 whereat the displacement of the weighing platform due to the imposed load applied at any position on the platform 91 is registered by a downward pivotal movement of the lever 96.

Moveover since the actual displacement of the weighing platform 91 is measured from the corresponding deflection of the leaf springs that is by means of the bar 95 resting across the springs 85S, a magnified value of the platform displacement is obtained, since the resultant deflection of the springs 85 at the invariant point is greater than the downward displacement of the platform thereat, which condition is an important characteristic of all the embodiments described above employing leaf springs.

Although a rectangular symmetrical array including parallel leaf springs along two sides of the weighing platform, has been described above, it will be appreciated that other configurations are possible.

For example a triangular disposition of leaf springs is feasible, with the weighing platform resting on the leaf springs so arranged.

In this case to provide a desired workable stability the platform will be of corresponding triangular shape or of a shape to ensure that the imposed load is applied generally within the limits of the triangle of springs, and the invariant measurement position, in the case of leaf springs of equal spring rate, at the geometrical centre of the triangle; if of unequal rate the invariant point would be at an off geometrical centre.

The above described embodiment according to the present invention using leaf springs extending beneath the weighing platform provide stability of operation with economy of construction compared to the prior art.

For example, with the embodiment shown in FIGS. 10, 11 and 12 the invariant measurement point will remain at the geometrical centre of the rectangle including the leaf springs, even though the platform looses contact with one of the four support points on the leaf springs 85 and accuracy of measurement of the imposed load will not suffer.

Moreover the fact that the leaf springs are continuous in extent beneath the weighing platform provides ingeniously, a means whereby full utilisation of the invariant displacement position of the platform irrespective of the position of the imposed load thereon, becomes possible in contrast to the prior art mentioned at the commencement of this disclosure and employing three coiled springs of equal rate at the corners of an equilateral array.

It will be seen that this is achieved, see for example in the embodiment described with reference to FIGS. 10, 11 and 12, by arranging a cross bar 95, between centre points along the two leaf springs 85, to intersect the invariant measurement position, and using the intersection point as a take-off point for translating the platform displacement into a readable measurement of the imposed load. Also as explained earlier, the displacement of the leaf springs registered by the downward displacement of the bar 95 represents a magnified or enlarged value of the actual displacement of the weighing platform 91 from which follows the ability to provide overall improved accuracy of weight measurement with economy of construction hitherto unachievable.

I claim:

1. A weighing machine comprising elongated elastic elements which provide for restorable deflection under load, each of said elastic elements being mounted between support means therefor, a weighing platform resting on the elastic elements such that an imposed load at any position on the platform produces a resultant displacement thereof occurring at an invariant position, and means for responding to said resultant deflection at said invariant position whereby to provide a measured value of a magnitude of the imposed load on the platform;

wherein said elastic elements are two leaf springs arranged between said support means such that points of support for each said element on said support means lie at corners of a rectangle with said leaf springs forming parallel sides thereof, and the invariant position lies at a center of the rectangle, said platform resting on both said leaf springs.

wherein further a rigid bar extends between each said leaf spring, ends of which are received in an indent formed in each said leaf spring along a length, thereof said bar intersecting said invariant position, and providing a take-off point for determining a resultant deflection of the springs thereat being a magnified value of the displacement of said platform at said invariant position.

2. A weighing machine as claimed in claim 1 wherein each leaf spring has indent portions along the length thereof, said platform having legs providing point support therefor on said springs, the legs engaging the indent portions thereby to prevent lateral movement of the platform along the length of the springs.

3. A weighing machine as claimed in claim 1 wherein a centre of the bar being at the invariant point is connected to a pivotal arm bearing a ratchet engaging a hub of a scale pointer for rotation thereof during pivotal movements of the pivotal arm, said pivotal arm being held in a normal upper pivotal position corresponding to zero loading on the platform.

4. A weighing machine comprising elongated elastic elements which provide for restorable deflection under load, each of said elastic elements being mounted between support means therefor, a weighing platform resting on said elastic elements such that an imposed load at any position on the platform produces a resultant displacement thereof occurring at an invariant position, and means for responding to said resultant deflection at said invariant position whereby to provide a measured value of a magnitude of the imposed load on the platform;

wherein the elastic elements are two leaf springs arranged in a form of a T, the leaf springs being housed in channel sections, resting on the springs at respective ends of the springs.

5. A weighing machine as claimed in claim 4 wherein a leaf spring support is provided at the end of each leaf spring and includes a confined roller ball against which bears a respective leaf spring for articulated support.

6. A weighing machine as claimed in claim 5 wherein the displacement of a platform formed by the channel sections at said invariant position is registered on a viewable load indicating disc positioned at one end of a leg of said T, said disc being rotable in response to said displacement of the platform.

7. A weighing machine as claimed in claim 6 wherein a pivotal lever is mounted in said leg of the T between said invariant position and said disc, and cord wound around a spindle at said disc and connected to one end of the lever, said lever being actuable in response to said displacement of the platform to cause the cord to rotate the disc.

8. A weighing machine comprising an elongated elastic element which provides for restorable deflection under load, said elastic element being mounted between support means therefor, a weighing platform resting on the elastic element such that an imposed load at any position on the platform produces a resultant displacement thereof occurring at an invariant position, and means for responding to said resultant deflection at said invariant position whereby to provide a measured value of a magnitude of the imposed load on the platform;

wherein said elastic element is in a form of a symmetrical three limbed leaf spring, ends of each limb resting on said support means such that said invariant displacement position lies at a center of symmetry of said leaf spring.

9. A weighing machine as claimed in claim 8 wherein said leaf spring is supported on pegs lying at corners of an equalaterial triangle on a base of a lower casing half of the machine, an upper casing half being disposed over said lower casing half and having an outer periphery which overhangs a periphery of said lower casing half and forming said weighing platform, said upper casing half having an annular abutment which rests on the ends of each limb of said leaf spring, said invariant point being on a central axis of the upper and lower casing.

10. A weighing machine as claimed in claim 9 where a roller ball is interposed between the annual abutmentment and each respective limb of the leaf spring, said roller ball being held in a recess in the abutment.

11. A weighing machine as claimed in claim 10 wherein said support pegs are provided with hemispherical bearing surfaces for the limbs of the leaf spring.

12. A weighing machine as in claim 1 comprising elongated elastic elements which provide for restorable deflection under load, each elastic element being mounted between support means therefor, a weighing platform resting on at least one of said elastic elements such that an imposed load at any position on the platform produces a resultant displacement thereof occurring at an invariant position, and means for responding to said resultant deflection at said invariant position whereby to provide a measured value of a magnitude of the imposed load on the platform;

wherein the elastic elements are two leaf springs joined at ends thereof in back-to-back relationship, one of said leaf springs being mounted across two supports, the other bearing the platform, whereby an imposed load in the platform produces an equal and opposite deflection in said leaf springs at a common invariant point, the resultant decrease in a spacing between the leaf springs being a measure of said magnitude of the imposed load.

13. A weighing machine comprising elastic elements in a form of a single leaf spring having an appreciable width in relation to a length thereof which provides for restorable deflection under load, the leaf spring being mounted on a support means for supporting the leaf spring, a weighing platform resting on the leaf spring at a plurality of positions such that an imposed load at any position on the platform produces a resultant displacement thereof occurring at an invariant position and means for responding to said resultant deflection at said invariant position to thereby provide a measure of a magnitude of the load on the platform.

* * * * *